March 29, 1966     N. McAVOY ETAL     3,243,700
EPR MASER SPECTROMETER
Filed Sept. 11, 1962
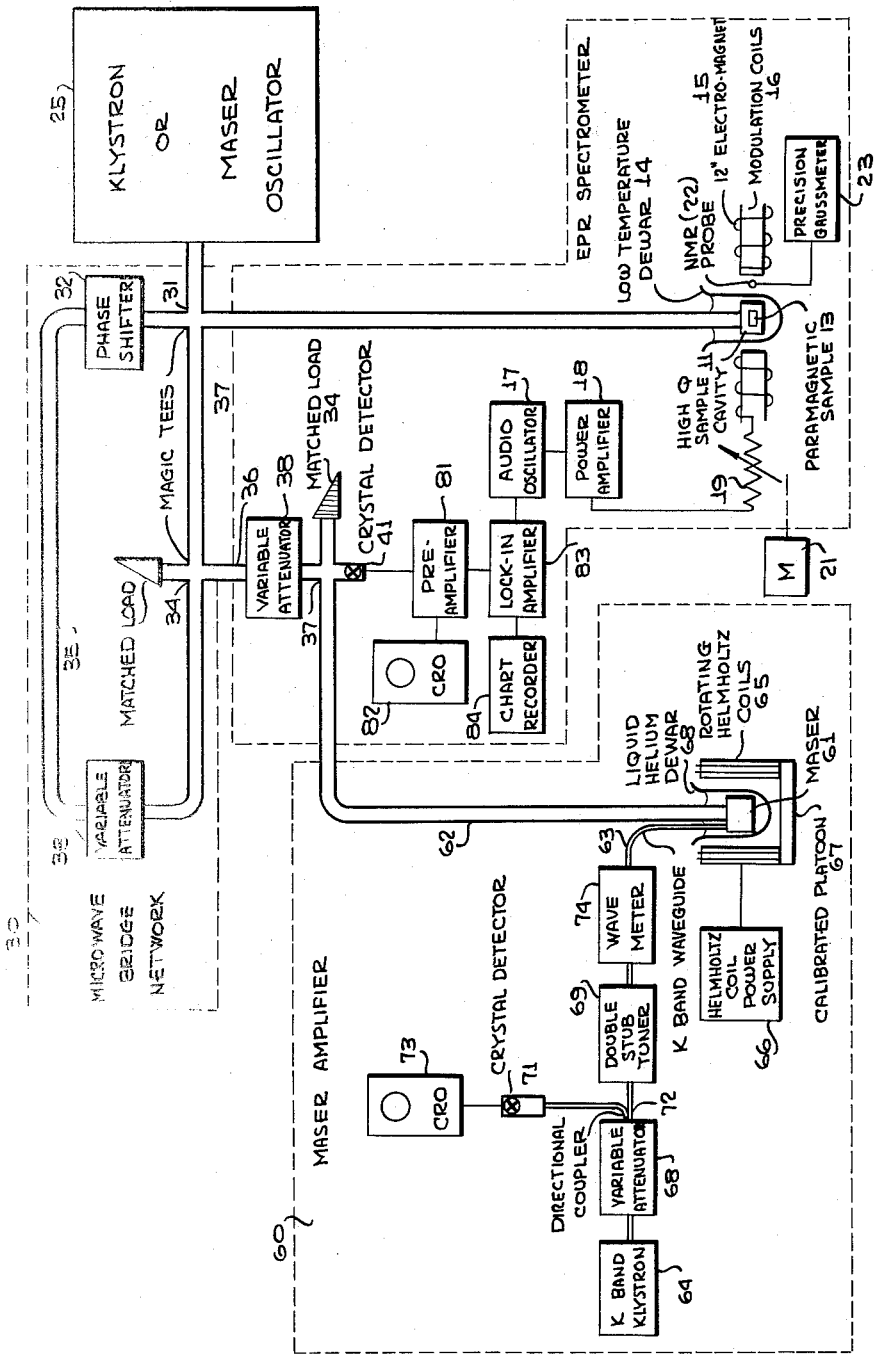
INVENTORS
NELSON McAVOY,
MORTON R. KAGAN
& VAN WINKLE T. TOWNSEND
BY Hurvitz & Rose
ATTORNEYS 3,243,700
EPR MASER SPECTROMETER
Nelson McAvoy, Fairfax, Va., Morton R. Kagan, Silver Spring, Md., and Van Winkle T. Townsend, Falls Church, Va., assignors to Melpar, Inc., Falls Church, Va., a corporation of Delaware
Filed Sept. 11, 1962, Ser. No. 222,920
18 Claims. (Cl. 324—58)

The present invention relates generally to electron paramagnetic resonance (EPR) spectrometers and more particularly to an EPR spectrometer employing a maser amplifier responsive to the signal derived from a sample being tested for paramagnetic resonance.

In the past, EPR studies have generally been conducted by either directly detecting the microwave energy reflected from a sample being tested or heterodyning the reflected energy to derive a difference frequency that is amplified and then detected. For samples having large electron spin populations, for example $10^{12}$, this approach is quite satisfactory. Tests on materials exhibiting lower electron spin populations, on the order of $10^9$, however, yield inaccurate data because the signal to noise ratio is too small to distinguish the reflected energy from the system quiescent noise level. This results from the necessity of utilizing a noisy, high power microwave source for energizing the sample. In order to supply sufficient power, 0.01 watt, to a sample having a spin population of $10^{12}$, it is necessary with the prior art devices to utilize a source having a noise temperature of $5 \times 10^{4\circ}$ K. As the spin population decreases, the supply of input power and its noise temperature must increase to provide a sufficiently large reflection from the sample. However, raising the input power and noise temperature of the energizing source increases the magnitude of the noise in the system so that the larger signal reflected from the sample is masked by the noise. Thus, an anomaly is reached for increased input power, which should give more sensitivity, causes large noise levels and a diminution in the ability to detect the signal. Also, for the smaller spin populations, it takes very little power to "saturate" the two spin levels of interest, especially at lower temperatures. When this saturation effect occurs, no spectrometer, no matter how sensitive can detect a signal. This is another, and perhaps even more important reason why only small microwave powers can be fed to the sample.

By the present invention system noise is greatly reduced by coupling the microwave signal reflected from the sample to a maser amplifier. Coupling is effected by a normally balanced microwave bridge that supplies signal to the maser amplifier only when the sample being investigated is excited to paramagnetic resonance. Utilization of the bridge isolates the maser from the sample and prevents detrimental saturation of the maser amplifier.

To couple energy between the bridge and a crystal detector employed for deriving an indicating signal via the low noise maser amplifier, a magic tee is employed. One arm of the magic tee is responsive to the output of the bridge. Another arm couples energy from the bridge to the maser and from the maser to the detector, located in a third arm of the magic tee.

To facilitate detection, the magnetic field energizing the cavity is modulated at an audio rate. In consequence, the detector output is an audio wave having the same frequency as the magnetic field modulation. These audio oscillations are compared in phase to derive a D.C. signal indicative of the absorption characteristics of the sample tested, said signal dependent on the value of the D.C. Zeeman splitting field applied to the sample. By observing the value of the D.C. field at which paramagnetic resonance occurs, the spectroscopic splitting factor of the tested sample may be computed.

We have found that utilization of a maser amplifier enables accurate EPR detection of samples having spin populations on the order of $3 \times 10^{10}$ with an excitation source of 0.01 watt. By cooling the sample from room temperature to cryogenic condition of 4° K., spin populations of $4 \times 10^8$ may be detected with the same power source. Results on the same order of magnitude are achieved by utilization of a low noise maser oscillator for energizing the sample. Such an oscillator maintained at 10° K. and delivering a power of only $10^{-6}$ watts, when utilized in conjunction with the maser amplifier, enables resonances occurring at spin population of $7 \times 10^9$ to be detected.

The foregoing results are based on resonant cavities having relatively low unloded Q's, for example 5000. By utilizing cavities having higher Q's, such as disclosed in the copending application of Morton R. Kagan, entitled "Tunable Microwave Cavity," sensitivity is increased by as much as a factor of ten.

It is accordingly an object of the present invention to provide a new and improved system for conducting EPR measurements.

Another object of the present invention is to provide a system for conducting EPR measurements on test samples having relatively low electron spin populations.

A further object of the present invention is to provide an extremely low noise system for conducting EPR measurements.

An additional object of the present invention is to provide an EPR spectrometer employing a source of microwave energy that is virtually noise free.

Still another object of the present invention is to provide an EPR spectrometer in which microwave energy reflected from the tested sample is coupled to a low noise amplifier prior to detection so that accurate indications of the sample paramagnetic resonance frequency, hence of its spectroscopic splitting factor are attained.

The above and still further objects, features and advantages of the present invention will become apparent upon consideration of the following detailed description of one spec ific embodiment thereof, especially when taken in conjunction with the accompanying drawings, wherein:

The sole figure is a schematic diagram of one form of the present invention.

Reference is now made to the single figure of the drawing which includes four main sub-assemblies, electron paramagnetic spectrometer 10, microwave oscillator 25, microwave bridge 30, and maser amplifier 60. Microwave energy is coupled from source 25 to spectrometer 10 via normally balanced bridge 30. When the sample being tested is not excited to electron paramagnetic resonance, no energy is supplied by bridge 30 to low noise maser amplifier 60. When the sample being tested in spectrometer 10 is excited to resonance, there is microwave energy coupled via bridge 30 to maser amplifier 60. The low noise, large microwave output of amplifier 60 is coupled back to spectrometer 10 where it is detected to provide an indication which aids in determining the paramagnetic resonant frequencies (lines) and spectroscopic splitting factors as well as other parameters of the sample.

Spectrometer 10 includes a cylindrical, high Q, tunable microwave cavity 11 excited to the $TE_{011}$ mode by microwave energy from source 25 which is coupled to waveguide 12, connected to the cavity aperture. Within cavity 11 is placed the sample 13 to be tested for paramagnetic resonance. Sample 13 is a solid, liquid, or gaseous material having a relatively low electron spin population, between $4 \times 10^8$ and $3 \times 10^{10}$, such as diphenylpicryl hydrazyl. For samples having spin populations at the upper extreme, cavity 11 may be maintained at room temperature, but tests on samples at the lower population limit must be conducted in a cryogenic environment, e.g. liquid helium or nitrogen temperatures. To lower the sample temperature to the necessary value, cavity 11 is immersed in Dewar flask 14 that contains liquid nitrogen or helium.

To establish the "steady" Zeeman splitting magnetic field necessary to conduct EPR studies, modulation coils 15 are wound on electromagnet 16. Coils 15 are energized by audio frequency oscillator 17 which feeds a 100-cycle signal to power amplifier 18, the output of which is coupled to rheostat 19. An audio frequency source is utilized to provide the "steady" magnetic field excitation because it modulates the microwave energy reflected from the cavity at a rate to enable facile detection. The audio frequency is small enough, compared to the microwave frequency of source 25, that no effect on the electromagnetic pattern established by the latter in cavity 11 occurs.

The impedance of rheostat 19 is continuously decreased while an experiment is being carried out by motor 21, the shaft of which is coupled to the rheostat slider. Thereby, the magnitude of the low frequency magnetic field energizing the sample is very slowly increased to control the absorption and resonance characteristics of sample 13 in accordance with the equation $$h\nu = g\beta H_0 \quad (1)$$

where:

$h$ = Planck's constant,
$\nu$ = frequency of source 25,
$g$ = spectroscopic splitting function of sample 13,
$\beta$ = Bohr magneton, and
$H_0$ = low frequency magnetic field.

To monitor the value of the low frequency magnetic field, and thereby determine the spectroscopic splitting factor of the sample, nuclear magnetic probe 22 is positioned intermediate and in alignment with electromagnets 16 and sample 13. Probe 22 is connected to precision gaussmeter 24 which provides a direct reading of the low frequency magnetic field sensed by probe 22.

X band microwave energy of extremely high frequency stabilization is coupled to cavity 11 from source 25 via magic tee 31, included in bridge 30, and waveguide 12. It is imperative that source 25 be of constant frequency, with no frequency modulation, to insure proper response from maser amplifier 60. Otherwise maser amplifier 60, which inherently has a very narrow bandpass, is incapable of passing the signal fed to it by bridge 30. A klystron oscillator having an output power of 0.01 watt is satisfactory if an uncooled sample with a spin population of $3 \times 10^{10}$ is being tested. The same oscillator may be utilized to conduct experiments on cooled specimens having spin populations of $4 \times 10^8$. If it is desired to utilize a maser oscillator maintained at liquid helium temperatures having a noise temperature of 10° K. and an output power of one microwatt, specimens having spin populations of $7 \times 10^9$ may be satisfactorily tested. The criterion for the type of oscillator utilized for source 24 in mathematical terms is derived infra.

Microwave bridge 30 includes, in addition to magic tee 31, phase shifter 32, variable attenuator 33, and magic tee 34. The arm of magic tee 31 opposite wave guide 12 is connected to phase shifter 32, the output of which is coupled via wave guide 35 to attenuator 33. Magic tee 34, from which the output of bridge 30 is derived, is fed with input signals at an opposed pair of its ports by the output of attenuator 33 and one of the ports of magic tee 31, respectively. The port of magic tee 34 opposite output waveguide 36 is connected to matched load 37, that absorbs any signal coupled to it.

In operation, microwave energy is coupled to magic tee junction 31 by source 25 and is divided equally, half going to phase shifter 32, the other half to cavity 11. A certain amount of the energy from cavity 11 is normally reflected back to magic tee 31 and is coupled to one of the input ports of magic tee 34 via wave guide 37. Bridge 30 is normally balanced by initially adjusting attenuator 33 and phase shifter 32 so that the two input signals to the opposed ports of magic tee junction 34 are equal but of opposite phase. Thereby, no net energy is supplied to magic tee 34 and no output is derived in waveguide 36. When the low frequency magnetic field coupled to sample 13 is of such magnitude as to excite it to paramagnetic resonance, the reflected energy from cavity 11 to magic tee 31 is materially altered. This results in an unbalancing of bridge 30 so that the amount of energy coupled to the opposed input ports of magic tee 34 is no longer equal. Thereby, a net signal is coupled to waveguide 36.

The output signal of bridge 30 in waveguide 36 is coupled to one port of magic tee junction 37 via variable attenuator 38. Attenuator 38 is utilized during the initial tuning up period in order to insure the coupling of a low amplitude signal to maser amplifier 60, thereby avoiding deleterious effects associated with amplifier saturation. Once the system has been tuned up by balancing bridge 30 and adjusting the resonant frequency of cavity 11, attenuator 38 is effectively removed from the circuit by adjusting it to zero db.

Utilization of bridge 30 is highly advantageous because it normally feeds no power to maser amplifier 60, and the latter is not subjected to quiescent power inputs that might cause saturation. When an unbalance in the bridge occurs, the signal level fed to maser amplifier will not be sufficiently great to cause maser saturation, an effect that otherwise would easily be attained. Low level amplifier saturation can have deleterious effects on the reading anent the paramagnetic line characteristics.

Connected to the opposed ports of magic tee 37 which are orthogonal to the input port, are maser amplifier 60 and matched load 39, respectively. Energy coupled to the input port is divided equally between maser amplifier 60 and load 39 so that an amplified microwave signal is fed to detector 41, positioned in the arm opposite to the input arm.

Maser amplifier 60 includes a 0.05% $Fe^{3+}$ doped $Al_2O_3$ rectangular parallelepiped that is located in cavity 61. The X band signal from magic tee 37 is coupled via waveguide 62 to maser cavity 61 where it is amplified by the pumping action of the K band energy supplied to wave guide 63 from klystron oscillator 64. A D.C. magnetic field is impressed on the maser by Helmholtz coils 65 which are energized by D.C. power supply 66 and are rotatable relative to cavity 61 by being secured to position calibrated, rotatable disc 67. The maser cavity 61 and the segments of waveguides 62 and 63 immediately adjacent thereto are placed in Dewar vessel 68 which is maintained at liquid helium temperatures.

It has been found that this maser amplifier performs admirably when subjected to a negligible magnetic field by coils 65. The material selected exhibits a high gain bandwidth product (15 mc.) so that large, noise free amplification results. The maser is considered as being of the zero field type because the paramagnetic resonances of 0.05% $Fe^{3+}$ doped $Al_2O_3$ in the X and K band frequencies occur with negligible magnetic fields. Of course, utilization of zero field masers is desirable since reductions in the size of coils 65 and the power requirements of supply 66 are attained. It has been found that excellent results are achieved with a signal frequency of 12.1K mc. and a pump frequency of 31.6K mc. because transitions between the $S=\frac{1}{2}$ and $S=\frac{5}{2}$ electron spin states of the selected maser material readily result.

This transition is possible since the $S=\frac{1}{2}$ state is not a pure state and is in fact an admixture of states that can be represented as $$|\pm\tfrac{1}{2}\rangle + \epsilon|\pm\tfrac{5}{2}\rangle$$

where $\epsilon$ is a very small number (.032 in this case). Similarly, the $S=\frac{5}{2}$ state is actually the admixture $$|\pm\tfrac{5}{2}\rangle - \epsilon|\mp\tfrac{1}{2}\rangle$$

To control the frequency and amplitude of the K band energy fed to waveguide 63, variable attenuator 68 and double stub tuner 69 are cascaded to klystron oscillator 64. To ascertain the amplitude of the K band energy, crystal detector 71 is connected to attenuator 68 via directional coupler 72. As the amplitude of the output from detector 71 is monitored on cathode ray oscilloscope 73, attenuator 68 is adjusted until the known, desired input power to maser cavity 61 is reached. To accurately control the pump frequency in wave guide 63, tuner 69 is adjusted until the desired reading from wave meter 74 is attained. Maser amplifier 61 will be ready for use when coils 65 are properly rotated to achieve a state of electron resonance for the material in cavity 61.

During operation, the 100-cycle modulation imposed on the microwave field reflected from cavity 11 is sensed by detector 41 after the microwave energy is amplified in maser 60. This 100-cycle signal, which of course occurs only when sample 13 is excited to resonance, is fed to pre-amplifier 81, the output of which is coupled in parallel to cathode ray oscilloscope 82 and lock-in amplifier 83. Oscilloscope 82 provides a visual indication of when an output signal is derived from detector 41.

Lock-in amplifier 83 includes a very narrow band amplifier responsive to the output of pre-amplifier 81 and a phase detector for comparing the narrow band amplifier output with that of oscillator 17. The resulting D.C. signal which attains maximum amplitude when sample 13 is excited to paramagnetic resonance is fed to chart recorder 84. By comparing the readings of recorder 84 and gaussmeter 23, accurate indications of $H_0$ for conditions of sample resonance are attained. Since $\nu$, the frequency of source 25, $h$, and $\beta$ are all known, $g$ is readily ascertained.

To properly select the power and noise temperature requirements for source 25, assuming sample 13 has an electron spin state, $S=\frac{1}{2}$, the following equation is utilized:

$$N_0 = \frac{8\Delta\nu K^{3/2} B^{1/2} V_c}{\nu \gamma^2 h^2 Q_0} \sqrt{\frac{T_n}{P_0}} T_s \qquad (1)$$

where:

$N_0$=total electron spin population of sample 13,
$\Delta\nu$=width of the paramagnetic line of sample 13, in cycles per sec.,
$K$=Boltzmann's constant, in ergs per degree Kelvin,
$B$=frequency bandwidth of source 25, in cycles per sec.,
$V_c$=volume of cavity 11, in cm.$^3$,
$\gamma$=gyromagnetic ratio of sample 13,
$Q_0$=unloaded Q (quality factor) of cavity 11,
$T_n$=noise temperature of source 25, in degrees Kelvin,
$P_0$=output power of source 25, in watts,
$T_s$=temperature of sample 13, in degrees Kelvin, and
$\nu$ and $h$ are defined supra.

To derive this equation, the following analysis is presented. It has been shown elsewhere that the change in voltage reflected from a sample holding cavity which occurs when the sample is excited to paramagnetic resonance as compared to a non-resonant state is:

$$\Delta V_{\text{refl}} = \sqrt{2RKBT_n} \qquad (2)$$

where $R_0$ is the noise resistance of the system feeding the cavity. Thus, the output power of source 25 may be written as $$P_0 = \frac{(\Delta V_{\text{refl}})^2}{R_0} \qquad (3)$$

It has also been shown that the magnetic quality factor $Q_m$ of cavity 11 may be expressed as $$\frac{1}{Q_m} = 4\pi X'' n = \frac{P_a}{\nu H_1^2 V_c} \qquad (4)$$

where:

$X''$=magnetic susceptibility (imaginary part) of cavity 11,
$n$=filling factor of sample 13,
$P_a$=power absorbed by sample 13, watts,
$H_1$=microwave magnetic field in cavity 11.

In addition, it has been shown that:

$$\frac{\Delta V_{\text{refl}}}{V_c} = \mp \sqrt{\frac{2}{4}} 4\pi X'' n Q_0 \qquad (5)$$

If a spin system is in equilibrium at a temperature $T_s$, it can be readily shown from Boltzmann's statistics that the spin population of any level $m$ exceeds that of $m-1$ by $$N_m - N_{m-1} \approx \frac{N_0}{(2S+1)} \frac{h\nu}{KT_s} \qquad (6)$$

where $h\nu$ is the energy difference between these levels and $N_0$ the total spin population of these levels. The power absorbed is then:

$$P_a = (N_m - N_{m-1}) h\nu W_{m \to m-1} \qquad (7)$$

where $$W_{m \to m-1}$$

is the induced transition probability for magnetic dipole transitions between levels represented by the magnetic quantum numbers $m$ and $m-1$. From quantum mechanical perturbation theory, the following expression applies to this system:

$$W_{m \to m-1} = \frac{1}{24} \gamma^2 H_1^2 g(\nu) S(2S+1)(S+1) \qquad (8)$$

where $\gamma$ is the gyromagnetic ratio $g\beta/h$ for electron spin, $S$ the spin state, and $g(\nu)$ is the absorption line shape function which is normalized to:

$$\int_0^\infty g(\nu) d\nu = 1 \qquad (9)$$

If the line shape is Lorentzian, the function $g(\nu)$ at the line center is given by $1/\Delta\nu$.

Combining Equations 3 through 9 and assuming $S=\frac{1}{2}$, for sample 13, the result of Equation 2 is derived.

While we have described and illustrated one specific embodiment of our invention, it will be clear that variations of the details of construction which are specifically illustrated and described may be resorted to without departing from the true spirit and scope of the invention as defined in the appended claims.

We claim:

1. A system for testing a sample for paramagnetic resonance comprising means including a source of microwave energy for selectively exciting the sample to paramagnetic resonance, a maser amplifier for the frequency of the microwave energy exciting said sample, means for coupling the microwave energy reflected from the sample to the maser amplifier only when the sample is excited to paramagnetic resonance, and means for sensing the output of said maser amplifier.

2. A system for testing a sample for paramagnetic resonance comprising means including a microwave energy source for selectively exciting the sample to paramagnetic resonance, a maser amplifier for the frequency of the microwave energy exciting said sample, means for coupling the microwave energy reflected from the sample to the maser amplifier, and means for sensing the output of said maser amplifier.

3. The system of claim 2 wherein said source is of constant predetermined frequency.

4. The system of claim 3 wherein said source is a klystron oscillator maintained at room temperatures.

5. The system of claim 3 wherein said source is a maser oscillator maintained at cryogenic temperatures.

6. The system of claim 3 wherein said source is an X band source and said maser amplifier includes a K band pumping source and an $Fe^{+3}$ doped $Al_2O_3$ material.

7. A system for testing a sample for paramagnetic resonance comprising means including a microwave energy source for selectively exciting the sample to paramagnetic resonance, a maser amplifier for the frequency of the microwave energy exciting said sample, means for coupling the microwave energy reflected from the sample to the maser amplifier, and means for sensing the output of said maser amplifier, wherein said means for coupling includes a junction having one port responsive to the energy reflected from the sample, a second port for coupling energy to and from the maser amplifier, and a third port for coupling energy to said means for sensing.

8. The system of claim 7 wherein said sample is maintained in a microwave cavity resonant at the frequency exciting said sample, at least one of said junctions including four ports, a first port of one of said junctions being connected to said source, a second port of said one junction being connected to said cavity, a third port of said one junction being connected to a port of the other junction, the fourth port of said one junction being connected via a phase shifter to another port of said other junction.

9. A system for testing a sample for paramagnetic resonance comprising means including a source of microwave energy for selectively exciting the sample to paramagnetic resonance, a maser amplifier for the frequency of the microwave energy exciting said sample, means to coupling the microwave energy reflected from the sample to the maser amplifier only when the sample is excited to paramagnetic resonance, said means for coupling including a microwave bridge responsive to said source and including only two junctions, and means for sensing the output of said maser amplifier.

10. A system for testing a sample for paramagnetic resonance comprising means including a source of microwave energy for selectively exciting the sample to paramagnetic resonance, a maser amplifier for the frequency of the microwave energy exciting said sample, means for coupling the microwave energy reflected from the sample to the maser amplifier only when the sample is excited to paramagnetic resonance, and means for sensing the output of said maser amplifier, wherein said means for coupling includes a junction having one port responsive to the energy reflected from the sample, a second port for coupling energy to and from the maser amplifier, and a third port for coupling energy to said means for sensing.

11. A system for testing a sample for paramagnetic resonance comprising means including a microwave energy source for selectively exciting the sample to paramagnetic resonance, a maser amplifier for the frequency of the microwave energy exciting said sample, means for coupling the microwave energy reflected from the sample to the maser amplifier only when the sample is excited to paramagnetic resonance, said coupling means including a microwave bridge responsive to said source and including only two junctions, means for sensing the output of said maser amplifier, said coupling means further including another junction, said another junction having; one port responsive to the output of said bridge, a second port for coupling energy to and from said maser amplifier, and a third port for coupling energy coupled to the second port from the maser amplifier to said means for sensing.

12. A system for testing a sample for paramagnetic resonance comprising means including a microwave energy source for selectively exciting the sample to paramagnetic resonance, a microwave detector, said microwave detector including a maser amplifier for the frequency of the microwave energy exciting said sample, means for coupling the microwave energy reflected from the sample to said microwave detector and amplifier only when said sample is excited to paramagnetic resonance, said coupling means including a microwave bridge responsive to said source and including only two junctions, said sample being maintained in a microwave cavity resonant to the frequency of the microwave energy coupled to said sample, at least one of said junctions including four ports, a first port of said one junction being connected to said source, a second port of said one junction being connected to said cavity, a third port of said one junction being connected to a port of the other junction, the fourth port of said one junction being connected to another port of said one junction, a phase shifter connecting said fourth port to said another port, a third port of said other junction coupling microwave energy at the frequency exciting said source to said maser amplifier.

13. The system of claim 12 wherein said cavity is excited to the $TE_{011}$ mode.

14. The system of claim 1 further including means for maintaining said sample at cryogenic temperatures.

15. The system of claim 11 further including a variable attenuator connected between the output of said bridge and said one port of said another junction responsive to the output of said bridge.

16. A system for testing a sample for paramagnetic resonance comprising means including a source of microwave energy for selectively exciting the sample to paramagnetic resonance, a zero magnetic field maser amplifier for amplifying the frequency of the microwave energy exciting said sample, means for coupling the microwave energy reflected from the sample to the maser amplifier only when the sample is excited to paramagnetic resonance, and means for sensing the output of said maser amplifier.

17. The system of claim 6 wherein the frequency of said X band source is 12.1K mc. and the pump frequency of said K band pumping source is 31.6K mc.

18. A system for testing a sample for paramagnetic resonance comprising means including a source of microwave energy for selectively exciting the sample to paramagnetic resonance, a maser amplifier for the frequency of the microwave energy exciting said sample, means for coupling the microwave energy reflected from the sample to the maser amplifier only when the sample is excited to paramagnetic resonance, said means for coupling including a microwave bridge responsive to said source and the reflected energy from said sample, said bridge being balanced except when said sample is excited to paramagnetic resonance.

References Cited by the Examiner

UNITED STATES PATENTS

| | | |
|---|---|---|
| 2,955,252 | 10/1960 | Williams. |
| 3,090,003 | 5/1963 | Rempel et al. _____ 324—58.5 X |
| 3,100,280 | 8/1963 | Hyde _____ 324—58.5 X |

OTHER REFERENCES

"The Maser a Molecular Amplifier for Microwave Radiation," article in Science, October 25, 1957, pages 810–814.

"Recording High Sensitivity Paramagnetic Resonance Spectrometer," article in The Review of Scientific Instruments (I), pages 34–40.

"Saturation of the Paramagnetic Resonance of a V Center," article in Physical Review, September 15, 1959, pages 1506–1515.

"Variable Coupling Reflection Cavity for Microwave Spectroscopy," article in The Review of Scientific Instruments (II), June 1961, pages 658–661.

WALTER L. CARLSON, *Primary Examiner.*

A. E. RICHMOND, *Assistant Examiner.*